US012694366B2

(12) United States Patent
Mukherjee et al.

(10) Patent No.: US 12,694,366 B2
(45) Date of Patent: *Jul. 28, 2026

(54) DISTRIBUTED LEDGER PLATFORM FOR IMPROVED RETURN LOGISTICS

(71) Applicant: Bank of America Corporation, Charlotte, NC (US)

(72) Inventors: Maharaj Mukherjee, Poughkeepsie, NY (US); Prashant Thakur, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/909,180

(22) Filed: Oct. 8, 2024

(65) Prior Publication Data

US 2025/0029056 A1     Jan. 23, 2025

Related U.S. Application Data

(63) Continuation of application No. 18/231,293, filed on Aug. 8, 2023, now Pat. No. 12,147,937, which is a
(Continued)

(51) Int. Cl.
    *G06Q 10/0837*     (2023.01)
    *G06K 19/06*       (2006.01)
    (Continued)

(52) U.S. Cl.
    CPC ... *G06Q 10/0837* (2013.01); *G06K 19/06037* (2013.01); *G06Q 10/0838* (2013.01);
    (Continued)

(58) Field of Classification Search
    None
    See application file for complete search history.

(56) References Cited

U.S. PATENT DOCUMENTS 7,124,095 B2 * 10/2006 Dutta .................... G06Q 30/06
                                                    705/26.81
8,036,905 B2 * 10/2011 Siegel ............... G06Q 30/0601
                                                    705/1.1
(Continued)

FOREIGN PATENT DOCUMENTS

CA       3027735 A1 * 12/2017    ......... G06Q 10/0837
WO   2017218914 A1   12/2017
(Continued)

OTHER PUBLICATIONS

Aste et al., Blockchain Technologies: The Foreseeable Impact on Society and Industry, Published in: Computer (vol. 50, Issue: 9, pp. 18-28), Sep. 22, 2017 (https://ieeexplore.ieee.org/document/8048633) (Year: 2017).*

(Continued)

*Primary Examiner* — Paul S Schwarzenberg
(74) *Attorney, Agent, or Firm* — Banner & Witcoff, Ltd.

(57) ABSTRACT

Aspects of the disclosure relate to return logistics. A computing platform may process a first request, resulting in first information indicating a first transfer of resources from a buyer of an item to a seller. The computing platform may record, in a distributed ledger, the first information. The computing platform may receive a second request corresponding to another sale of the item, and may process the second request, which may result in second information indicating a second transfer of resources from another buyer to the seller. The computing platform may record, in the distributed ledger, the second information, and may cause the item to be sent from the buyer to the other buyer. The computing platform may identify, using the distributed ledger, that the item has been received by the other buyer, and may cause a third transfer of resources from the seller to the buyer.

20 Claims, 10 Drawing Sheets

Related U.S. Application Data continuation of application No. 17/308,198, filed on May 5, 2021, now Pat. No. 11,763,248.

(51) Int. Cl.

| | |
|---|---|
| *G06Q 10/083* | (2023.01) |
| *G06Q 10/10* | (2023.01) |
| *G06Q 20/38* | (2012.01) |
| *G06Q 20/40* | (2012.01) |
| *G06Q 30/018* | (2023.01) |

(52) U.S. Cl.

CPC ........... *G06Q 10/10* (2013.01); *G06Q 20/389* (2013.01); *G06Q 20/407* (2013.01); *G06Q 30/018* (2013.01)

(56) References Cited

U.S. PATENT DOCUMENTS

| | | | |
|---|---|---|---|
| 9,436,923 | B1 | 9/2016 | Sriram et al. |
| 9,641,342 | B2 | 5/2017 | Sriram et al. |
| 10,467,586 | B2 | 11/2019 | Fuller et al. |
| 10,482,700 | B2 | 11/2019 | Soeda |
| 10,520,922 | B2 | 12/2019 | Kumar et al. |
| 10,521,806 | B2 | 12/2019 | Cantrell et al. |
| 10,685,323 | B2 | 6/2020 | Fuller et al. |
| 10,692,086 | B2 | 6/2020 | Leong et al. |
| 10,693,662 | B2 | 6/2020 | Nguyen et al. |
| 10,817,829 | B2 | 10/2020 | Jacobson et al. |
| 10,868,676 | B2 | 12/2020 | Nguyen et al. |
| 10,949,417 | B2 | 3/2021 | Kurian et al. |
| 10,970,669 | B2 | 4/2021 | Yund et al. |
| 10,984,474 | B1 | 4/2021 | Seymour et al. |
| 2019/0236604 | A1* | 8/2019 | Mchale ............... G06Q 20/389 |
| 2019/0258986 | A1 | 8/2019 | Nguyen et al. |
| 2019/0258991 | A1 | 8/2019 | Nguyen et al. |

FOREIGN PATENT DOCUMENTS

| | | | | |
|---|---|---|---|---|
| WO | 2020023441 | A1 | 1/2020 | |
| WO | 2020030936 | A1 | 2/2020 | |
| WO | 2020036731 | A1 | 2/2020 | |
| WO | WO-2020164738 | A1 * | 8/2020 | ............. G06Q 20/02 |

OTHER PUBLICATIONS

Aste et al., "Blockchain Technologies: The Foreseeable Impact on Society and Industry" Published in: Computer (vol. 50, Issue: 9, pp. 18-28) Sep. 22, 2017, https://ieeexplore.ieee.org/document/8048633.
May 26, 2023—(US) Notice of Allowance—U.S. Appl. No. 17/308,198.
Jan. 25, 2023—(US) Office Action—U.S. Appl. No. 17/308,198.
May 14, 2024—(US) Office Action—U.S. Appl. No. 18/231,293.
Aug. 27, 2024—(US) Notice of Allowance—U.S. Appl. No. 18/231,293.

* cited by examiner

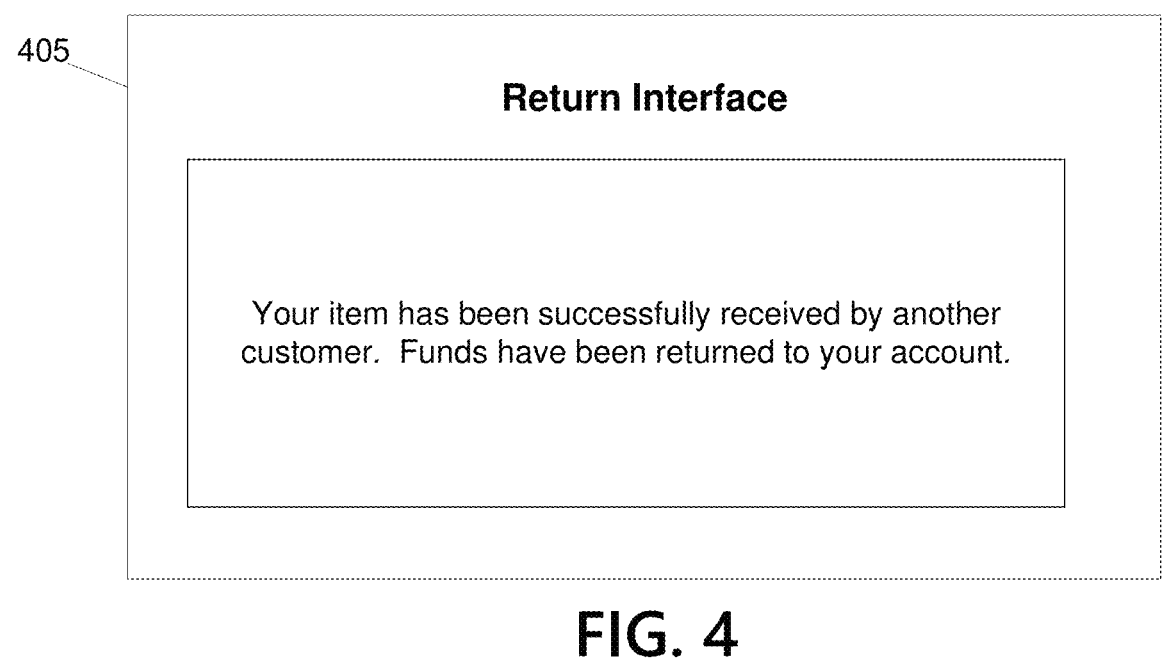

405

Return Interface

Your item has been successfully received by another customer.  Funds have been returned to your account.

FIG. 4

DISTRIBUTED LEDGER PLATFORM FOR IMPROVED RETURN LOGISTICS

CROSS REFERENCE TO RELATED APPLICATION

This application claims priority to and is a Continuation of U.S. Ser. No. 18/231,293, filed on Aug. 8, 2023, and is a Continuation application of U.S. Ser. No. 17/308,198, filed on May 5, 2021, and titled "Distributed Ledger Platform for Improved Return Logistics." The related application is incorporated by reference herein in its entirety for all purposes.

BACKGROUND

Aspects of the disclosure relate to supply chain logistics. In particular, one or more aspects of the disclosure relate to using a distributed ledger to improve supply chain logistics.

In some instances, re-shelving may create a major bottle neck in supply chain reverse logistics. For example, when an individual returns an item, it may require time/effort to put the item back into the supply chain so that it may be shipped to another customer. Accordingly, it may be important to improve the operational efficiency of such supply chain logistics, in a way that enables computing systems to efficiently and effectively handle such returns and the corresponding transactions.

SUMMARY

Aspects of the disclosure provide effective, efficient, scalable, and convenient technical solutions that address and overcome the technical problems associated with return logistics. In accordance with one or more embodiments of the disclosure, a computing platform comprising at least one processor, a communication interface, and memory storing computer-readable instructions may receive a first event processing request corresponding to a first sale of an item. The computing platform may process the first event processing request, resulting in first event processing information indicating a first transfer of resources from a first buyer of the item to a seller of the item. The computing platform may create a first element of a distributed ledger corresponding to the item. The computing platform may record, in the first element of the distributed ledger corresponding to the item, the first event processing information, an identity of the first buyer, and an identity of the seller, and a first portion of distributed ledger may be visible to the first buyer and the seller. The computing platform may receive a second event processing request corresponding to a second sale of the item. The computing platform may process the second event processing request, which may result in second event processing information indicating a second transfer of resources from a second buyer of the item to the seller. The computing platform may create a second element of the distributed ledger. The computing platform may record, in the second element of the distributed ledger, the second event processing information, a return policy for the item, an identity of the second buyer, and the identity of the seller, where the second portion of the distributed ledger may be visible to the second buyer and the seller. The computing platform may cause the item to be sent from the first buyer to the second buyer, where the first buyer may have sent a request to return the item, and where causing the item to be sent from the first buyer to the second buyer may include: 1) generating, based on the distributed ledger, anonymous shipping information corresponding to the second buyer, 2) allowing the first buyer to access the anonymous shipping information using the distributed ledger, 3) recording shipping confirmation information indicating that the item has been shipped from the first buyer to the second buyer, and 4) recording receipt confirmation information indicating that the item has been received by the second buyer. The computing platform may identify, using the distributed ledger, that the item has been received by the second buyer. Based on identifying that the item has been received by the second buyer, the computing platform may process a third event, which may cause a third transfer of resources, equal to the first transfer of resources, from the seller to the first buyer.

In one or more instances, generating the anonymous shipping information may be based on analyzing the return policy. In one or more instances, the anonymous shipping information may be a quick response (QR) code.

In one or more embodiments, the anonymous shipping information may be a label that may be used by a shipping company to send the item to the second buyer, and that does not expose, to the first buyer, an identity of the second buyer. In one or more instances, the distributed ledger may be a blockchain.

In one or more instances, the first transfer of resources may be different than the second transfer of resources. In one or more instances, the computing platform may generate one or more commands directing a user device of the first buyer to display a graphical user interface indicating that the return has been completed. The computing platform may send, to the user device, the one or more commands to display the graphical user interface indicating that the return has been completed, which may cause the user device to display the graphical user interface indicating that the return has been completed.

In one or more embodiments, the first transfer of resources may be a fund transfer from an account of the first buyer to an account of the seller. The second transfer of resources may include a fund transfer from an account of the second buyer to the account of the seller. The third transfer of resources may include a fund transfer from the account of the seller to the account of the first buyer.

In one or more instances, the first buyer may be unable to access: 1) the identity of the second buyer using the distributed ledger, and 2) an amount paid by the second buyer for the item. In one or more instances, the computing platform may generate, using the distributed ledger, one or more smart contracts corresponding to sales of the item, where the one or more smart contracts may be used by an entity corresponding to the computing platform to identify when resources should be returned from the seller to the first buyer.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 4 depicts an illustrative graphical user interface for improved return logistics using a distributed ledger in accordance with one or more example embodiments.

DETAILED DESCRIPTION

Figure 1A:
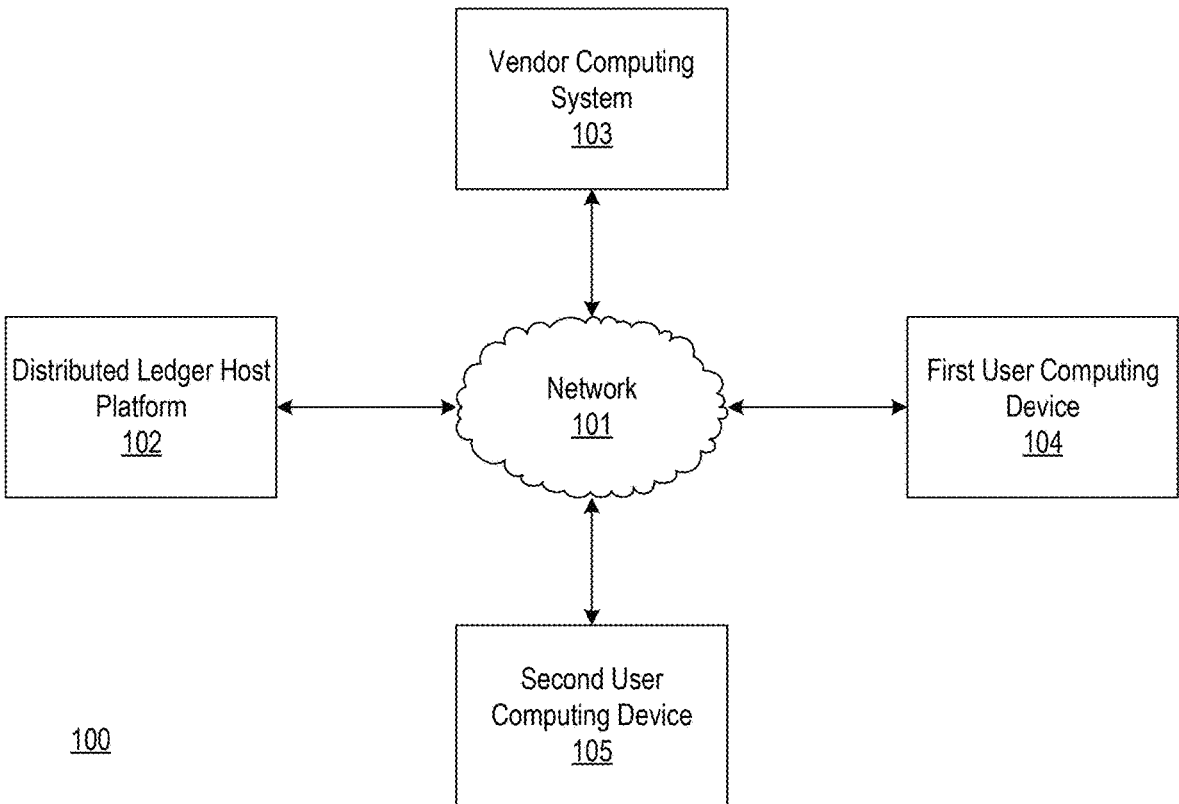
FIGS. 1A-1B depict an illustrative computing environment for improved return logistics using a distributed ledger in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe systems and methods for improved return logistics. For example, in the reverse logistics of a supply chain, re-shelving may be a major bottle neck that may be difficult to solve. Even for an item that may be returned in perfect factory condition without any damage or missing parts, it may take significant effort to put the item back into the supply chain so that it may be shipped back to another customer.

In order to solve for this problem of re-shelving or re-warehousing items (e.g., restocking items that have been returned to a seller by a buyer), many retailers or wholesalers may consider asking customers to return the items to another customer who might have a need for the item (for instance, instead of returning the item to the seller). In this way, the item may stay within the forward path of the supply chain, and might not fall into reverse logistics.

For example, customer X may need an item urgently, and may order it from multiple vendors (vendor A and vendor B). Once the item from vendor A arrives, customer X may decide that they have enough of the particular item already, and may want to return the item from vendor B. Under normal circumstances, the item returned to vendor B may stay on a shelf for a long time, along with other items that may or might not be returned to the supply chain later. However, if instead vendor B directs customer X to send the item to customer Y who might have a need for the item, it may solve the problem of re-shelving, as well as the problem of urgently needing the item to be delivered in time. This is one example of the item staying within the forward path of the supply chain and not falling into the reverse logistics.

However, it may be difficult to handle the transactions of several bank accounts for credits and debits using the approach described above. For example, vendor B should not only credit the account of customer X—it should also debit the account of customer Y. The problem may get more complicated when the transactions are handled by one large corporation providing the supply chain facilities to different market participant vendors and customers.

Accordingly, described herein is a solution to these problems. In some instances, the blockchain described herein may be provided by a financial institution to a supply chain organization for all customers and vendors.

A blockchain is a growing list of records, called blocks, which may be linked using cryptography. Each block may contain a cryptographic hash of the previous block, a time-stamp, and transaction data (which may be represented as a Merkle tree). By design, a blockchain may be immutable or resistant to modification of its data. This is because once recorded, the data in any given block cannot be altered retroactively without alteration of all subsequent blocks.

For use as a distributed ledger, a blockchain may be managed by a peer to peer network collectively adhering to a protocol for inter-node communication and validating new blocks. Although blockchain records are not unalterable, blockchain may be considered secure by design and exemplify a distributed computing system with high Byzantine fault tolerance. The blockchain has been described as an open distributed ledger that may record transactions between two parties efficiently and in a verifiable and permanent way.

Blockchain has not previously been used where more than two parties are involved in the return of an item and reverse logistics are turned into forward logistics. However, because blockchain is an immutable open ledger, it may provide the basic trustless mechanism to handle transactions that involve more than two parties.

Simply put, whenever a transaction occurs during the life cycle of a product, the transaction is recorded on the blockchain, which may be verified by each party. For example, the following items (as described above) may be recorded in a blockchain as a set of transactions: 1) customer X makes a request to return an item to vendor B, 2) customer Y makes a request to purchase the same item from vendor B, 3) vendor B determines that: a) customer Y has made a request to purchase the same item that customer X wants to return, b) vendor B approves the request and sends a return receipt for customer X addressed to customer Y, c) customer X ships the item to customer Y, and it may be recorded on the blockchain by vendor B by the notification from the shipping company, and d) customer Y receives and acknowledges the receipt of the item, and 4) vendor B credits the account of customer X and debits the account of customer Y.

Since the entire transaction is on the open ledger, it may be verified by all interested parties and stake holders such as customers X and Y, vendor B, the shipping company, and/or other parties. The whole blockchain may be provided by a financial institution to another company, such as a company that hosts an online market for multiple customers/vendors. This type of multi-party reverse logistics system may be implemented on a blockchain either for a cryptocurrency, a regular currency, and/or a mixture of any currency types.

Figure 1B:
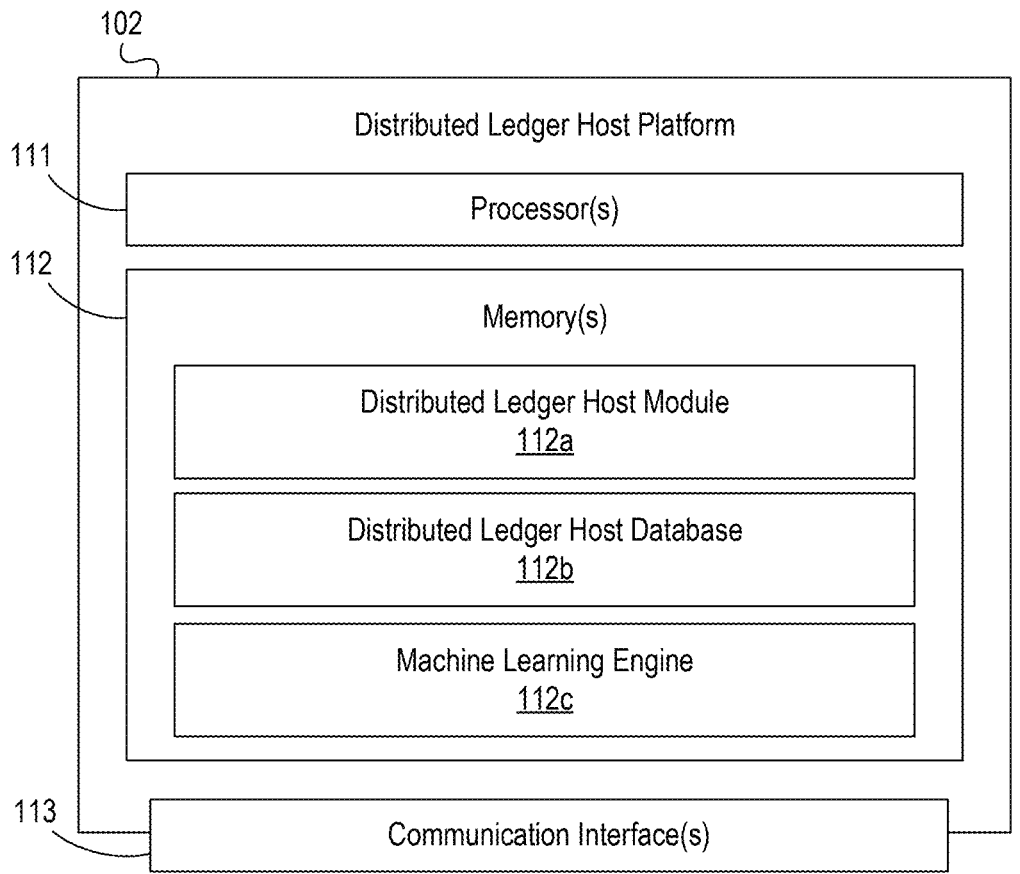

FIGS. 1A-1B depict an illustrative computing environment for improved return logistics using a distributed ledger in accordance with one or more example embodiments. Referring to FIG. 1A, computing environment 100 may include one or more computer systems. For example, computing environment 100 may include distributed ledger host platform 102, vendor computing system 103, first user computing device 104, and second user computing device 105.

As described further below, distributed ledger host platform 102 may be a computer system that includes one or more computing devices (e.g., servers, server blades, or the like) and/or other computer components (e.g., processors, memories, communication interfaces) that may be configured to establish, host, and otherwise maintain a distributed ledger (e.g., a blockchain). In some instances, the distributed ledger host platform 102 may be managed by, affiliated with, or otherwise correspond to a financial institution, and may be configured to host the distributed ledger on behalf of a market (e.g., live or online) that serves as a selling/purchasing platform for multiple vendors/purchasers. For example, the distributed ledger host platform 102 may be configured to maintain, using the distributed ledger, records of transactions between various buyers and sellers, and to use the distributed ledger to execute one or more events (e.g., a fund transfer).

Vendor computing system 103 may be a computer system that includes one or more computing devices (e.g., desktop computers, laptop computers, mobile devices, smartphones, tablets, servers, server blades, or the like) and/or other computer components (e.g., processors, memories, communication interfaces) that may be configured to host the market described above, and to facilitate transactions between various buyers and sellers. Additionally or alternatively, the vendor computing system 103 may be affiliated with a particular vendor or merchant, and may be configured to manage sales, returns, and/or other transactions for that vendor.

First user computing device 104 may be a laptop computer, desktop computer, mobile device, tablet, smartphone, or the like that may be used by a customer to conduct one or more transactions with the vendor computing system 103 (e.g., purchases, returns, and/or other transactions). In some instances, first user computing device 104 may be configured to display one or more user interfaces (e.g., purchasing interfaces, return interfaces, and/or other interfaces).

Second user computing device 105 may be a laptop computer, desktop computer, mobile device, tablet, smartphone, or the like that may be used by a customer (e.g., a different customer) to conduct one or more transactions with the vendor computing system 103 (e.g., purchases, returns, and/or other transactions). In some instances, second user computing device 105 may be configured to display one or more user interfaces (e.g., purchasing interfaces, return interfaces, and/or other interfaces).

Computing environment 100 also may include one or more networks, which may interconnect distributed ledger host platform 102, vendor computing system 103, first user computing device 104, and/or second user computing device 105. For example, computing environment 100 may include a network 101 (which may interconnect, e.g., distributed ledger host platform 102, vendor computing system 103, first user computing device 104, and/or second user computing device 105).

In one or more arrangements, distributed ledger host platform 102, vendor computing system 103, first user computing device 104, and/or second user computing device 105 may be any type of computing device capable of sending and/or receiving requests and processing the requests accordingly. For example, distributed ledger host platform 102, vendor computing system 103, first user computing device 104, second user computing device 105 and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of distributed ledger host platform 102, vendor computing system 103, first user computing device 104, and/or second user computing device 105, may, in some instances, be special-purpose computing devices configured to perform specific functions.

Referring to FIG. 1B, distributed ledger host platform 102 may include one or more processors 111, memory 112, and communication interface 113. A data bus may interconnect processor 111, memory 112, and communication interface 113. Communication interface 113 may be a network interface configured to support communication between distributed ledger host platform 102 and one or more networks (e.g., network 101, or the like). Memory 112 may include one or more program modules having instructions that when executed by processor 111 cause distributed ledger host platform 102 to perform one or more functions described herein and/or one or more databases that may store and/or otherwise maintain information which may be used by such program modules and/or processor 111. In some instances, the one or more program modules and/or databases may be stored by and/or maintained in different memory units of distributed ledger host platform 102 and/or by different computing devices that may form and/or otherwise make up distributed ledger host platform 102. For example, memory 112 may have, host, store, and/or include distributed ledger host module 112a, distributed ledger host database 112b, and machine learning engine 112c.

Distributed ledger host module 112a may have instructions that direct and/or cause distributed ledger host platform 102 to execute advanced return logistics procedures. Distributed ledger host database 112b may store information used by distributed ledger host module 112a and/or distributed ledger host platform 102 in application of advanced return logistics procedures, and/or in performing other functions. Machine learning engine 112c may have instructions that direct and/or cause the distributed ledger host platform 102 to set, define, and/or iteratively refine optimization rules and/or other parameters used by the distributed ledger host platform 102 and/or other systems in computing environment 100.

Figure 2A:
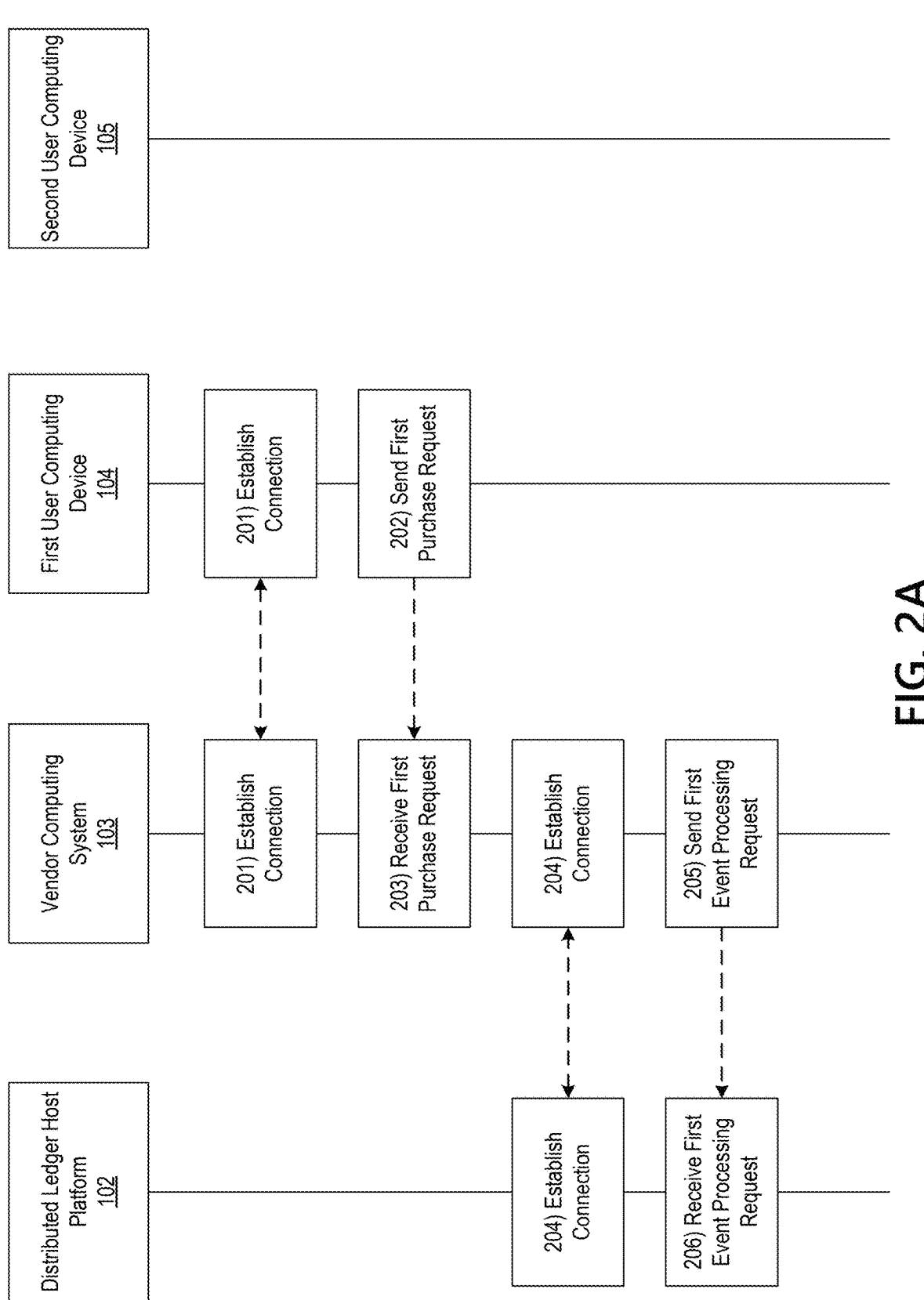
FIGS. 2A-2F depict an illustrative event sequence for improved return logistics using a distributed ledger in accordance with one or more example embodiments.

FIGS. 2A-2F depict an illustrative event sequence for improved return logistics using a distributed ledger in accordance with one or more example embodiments. Referring to FIG. 2A, at step 201, first user computing device 104 may establish a connection with the vendor computing system 103. For example, the first user computing device 104 may establish a first wireless data connection with the vendor computing system 103 to link the first user computing device 104 to the vendor computing system 103 (e.g., in preparation for sending a first purchase request). In some instances, the first user computing device 104 may identify whether or not a connection is already established with the vendor computing system 103. If a connection is already established, the first user computing device 104 might not re-establish the connection. If a connection is not yet established, the first user computing device 104 may establish the first wireless data connection as described herein.

At step 202, the first user computing device 104 may send a first purchase request to the vendor computing system 103. For example, the first user computing device 104 may send a first purchase request to the vendor computing system 103, requesting that an item be purchased for a user of the first user computing device 104 (e.g., a first buyer) from an enterprise associated with the vendor computing system 103 (e.g., a seller). In some instances, the first user computing device 104 may send the first purchase request to the vendor computing system 103 while the first wireless data connection is established. In some instances, in sending the first purchase request, the first user computing device 104 may send an identifier of the item to be purchased and payment information (e.g., account number, credit card number, and/or other payment information) that may be used to process the sale.

At step 203, the vendor computing system 103 may receive the first purchase request (e.g., the seller may receive the order for the item). For example, the vendor computing system 103 may receive the first purchase request from the first user computing device 104 while the first wireless data connection is established.

At step 204, the vendor computing system 103 may establish a connection with the distributed ledger host platform 102. For example, the vendor computing system 103 may establish a second wireless data connection with the distributed ledger host platform 102 to link the vendor computing system 103 to the distributed ledger host platform 102 (e.g., in preparation for sending an event processing request). In some instances, the vendor computing system 103 may identify whether or not a connection is already established with the distributed ledger host platform 102. If a connection is already established with the distributed ledger host platform 102, the vendor computing system 103 might not re-establish the connection. If a connection is not yet established with the distributed ledger host platform 102, the vendor computing system 103 may establish the second wireless data connection as described herein.

At step 205, the vendor computing system 103 may send a first event processing request (e.g., a request to transfer resources/funds from the first buyer to the seller) to the distributed ledger host platform 102. For example, the vendor computing system 103 may send the payment information that may be processed in exchange for the item. In some instances, the vendor computing system 103 may also send information identifying the first user, the item, and/or other information related to the sale. In some instances, the vendor computing system 103 may send the first event processing request to the distributed ledger host platform 102 while the second wireless data connection is established.

At step 206, the distributed ledger host platform 102 may receive the first event processing request sent at step 205. For example, the distributed ledger host platform 102 may receive the first event processing request via the communication interface 113 and while the second wireless data connection is established.

Figure 2B:
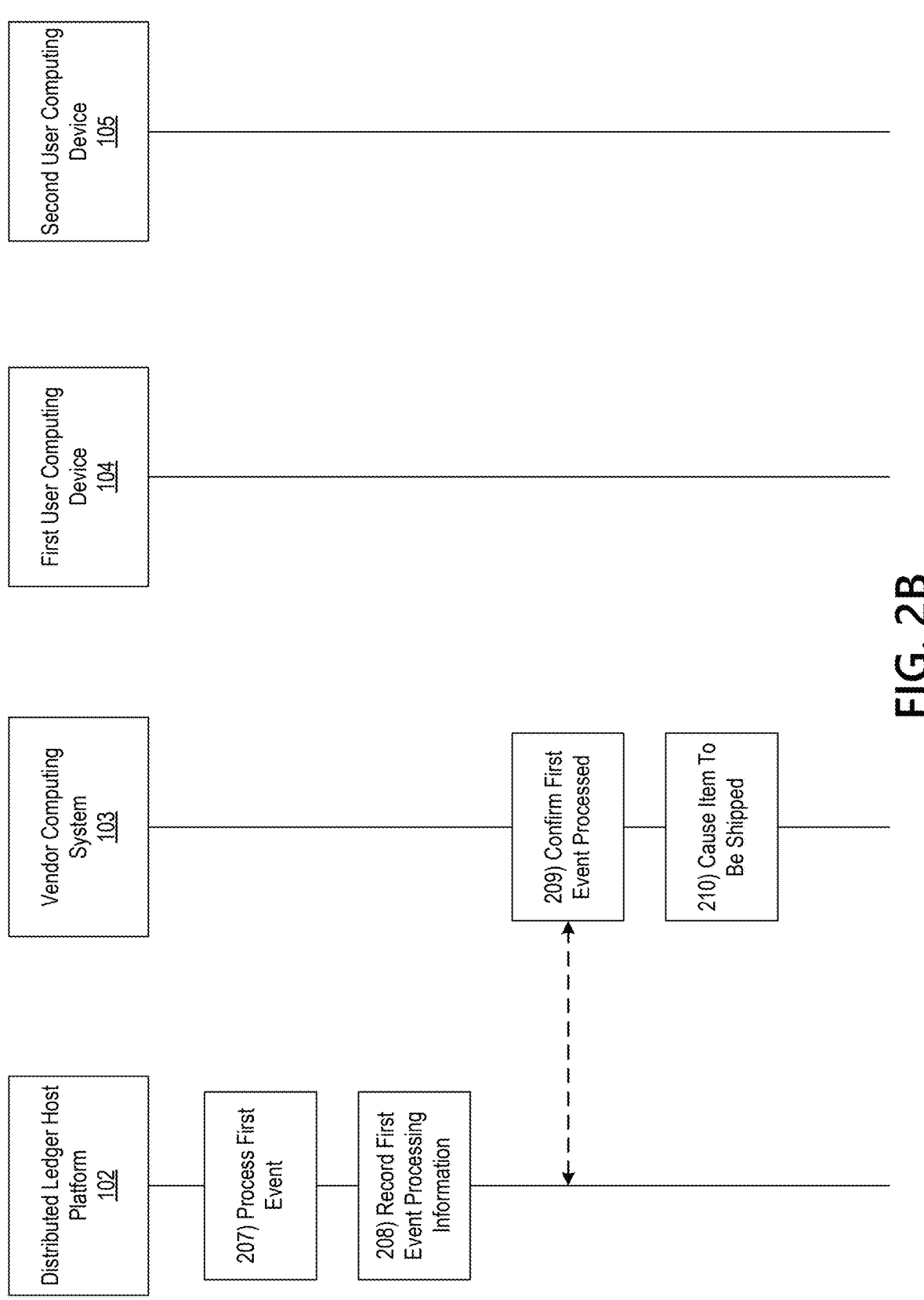

Referring to FIG. 2B, at step 207, the distributed ledger host platform 102 may process the first event. For example, the distributed ledger host platform 102 may be controlled or otherwise affiliated with a financial institution, and may cause funds (equal to the sale price of the item) to be transferred from the first buyer (e.g., from a bank account or other source of funds) to the seller (e.g., into an account or the like).

At step 208, the distributed ledger host platform 102 may record first event processing information in a distributed ledger hosted by the distributed ledger host platform 102. For example, the distributed ledger host platform 102 may create a first block in a blockchain corresponding to the sale of the item between the first buyer and the seller. In some instances, the distributed ledger host platform 102 may record information such as time, date, first buyer identity, sale price, seller identity, and/or other information in the first block. In some instances, the first block of the blockchain may be accessible to the seller, the first buyer, employees of the financial institution, but may otherwise not be accessible by other individuals (the blockchain may be a private blockchain). In some instances, the distributed ledger host platform 102 may configure information stored in the first block of the blockchain to be selectively concealed to certain parties who may otherwise have access to the full first block. In some instances, rather than sending information to the distributed ledger host platform 102, and having the distributed ledger host platform 102 write the information to the block, the vendor computing system and/or first user computing device 104 may directly write/record the information in the first block. In some instances, in recording the first event processing information, the distributed ledger host platform 102 may generate a smart contract corresponding to the sale of the item, and which may subsequently be used to identify when resources should be transferred from the seller to the first buyer in the event of a return.

At step 209, the vendor computing system 103 may access the distributed ledger (e.g., the first block established at step 208) to confirm that the first event was processed (e.g., that the first buyer successfully paid for the item). If the vendor computing system 103 identifies that the first event was not successfully processed, a notification may be sent to the first user computing device 104, and the first user computing device 104 may return to step 202 to resubmit the first purchase request, or otherwise modify the transaction. If the vendor computing system 103 identifies that the first event was successfully processed, the distributed ledger host platform 102 may proceed to step 209.

At step 210, the vendor computing system 103 may cause the first item to be shipped to the first buyer. For example, the vendor computing system 103 may display an interface directing one or more individuals to initiate a shipping process and/or may communicate directly with a computing system corresponding to a shipping company, indicating that the item should be shipped to the first buyer.

Figure 2C:
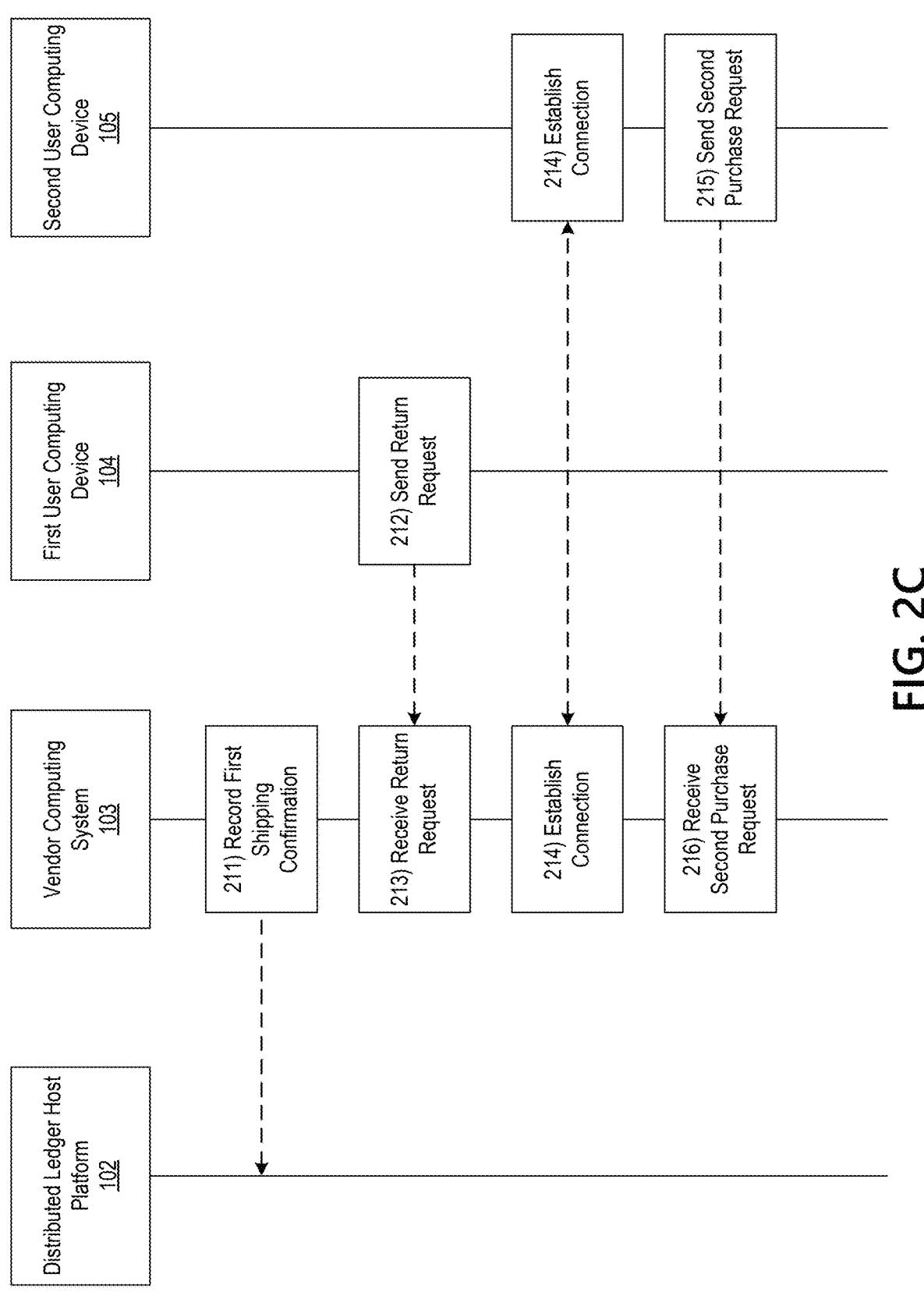

Referring to FIG. 2C, at step 211, the vendor computing system 103 may record first shipping confirmation information in the first block of the distributed ledger. For example, the vendor computing system 103 may directly access the first block, or may otherwise communicate with the distributed ledger host platform 102 to cause the distributed ledger host platform 102 to write/record the first shipping confirmation information in the first block. For example, in recording the first shipping confirmation information, the vendor computing system 103 may record information indicating that the item was successfully shipped to and/or received by the first buyer.

At step 212, the first user computing device 104 may send a return request to the vendor computing system 103. For example, the first user computing device 104 may send a message to the vendor computing system 103 notifying the vendor computing system 103 that the item will be returned. In some instances, the first user computing device 104 may send the return request to the vendor computing system 103 while the first wireless data connection is established.

At step 213, the vendor computing system 103 may receive the return request sent at step 212. For example, the vendor computing system 103 may receive the return request while the first wireless data connection is established.

At step 214, the second user computing device 105 may establish a connection with the vendor computing system 103. For example, the second user computing device 105 may establish a third wireless data connection with the vendor computing system 103 to link the second user computing device 105 to the vendor computing system 103 (e.g., for purposes of sending a second purchase request). In some instances, the second user computing device 105 may identify whether or not a connection is already established with the vendor computing system 103. If a connection is already established with the vendor computing system 103, the second user computing device 105 might not re-establish the connection. If a connection is not yet established with the vendor computing system 103, the second user computing device 105 may establish the third wireless data connection as described herein.

At step 215, the user computing device 105 may send a second purchase request to the vendor computing system 103. For example, the user computing device 105 may send the second purchase request to the vendor computing system 103 while the third wireless data connection is established. Actions performed at step 215 by the second user computing device 105 may be similar to those described at step 202 with regard to the first user computing device 104.

At step 216, the vendor computing system 103 may receive the second purchase request. For example, the vendor computing system 103 may receive the second purchase request while the third wireless data connection is established. Actions performed at step 216 may be similar to those described above at step 204 with regard to the first purchase request.

Figure 2D:
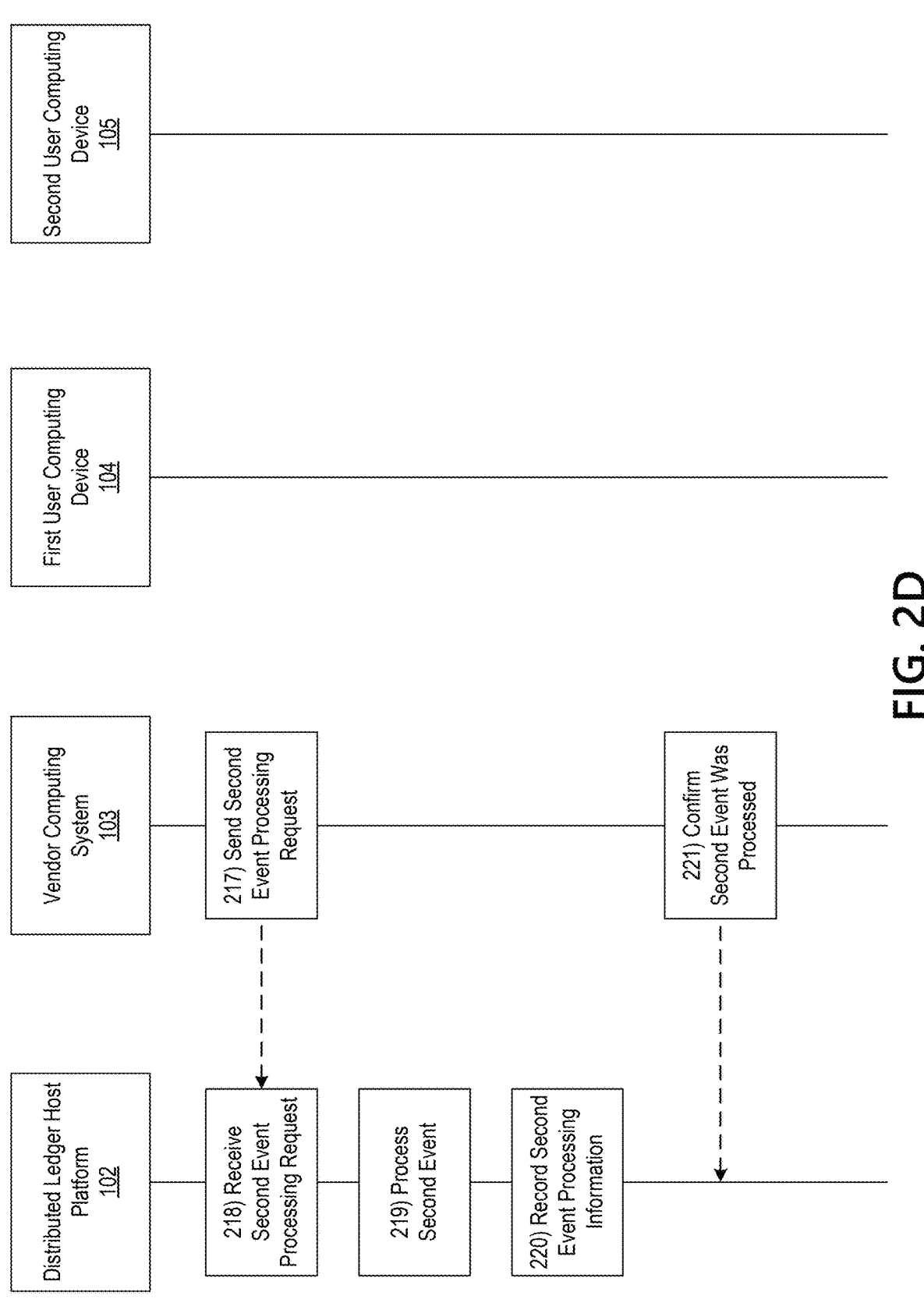

Referring to FIG. 2D, at step 217, the vendor computing system 103 may send the second event processing request (e.g., requesting a transfer of funds/resources from an account of the second buyer to an account of the seller) to the distributed ledger host platform 102. For example, the vendor computing system 103 may send the second event processing request to the distributed ledger host platform 102 while the second wireless data connection is established. In some instances, actions performed at step 217 may be similar to those described at step 205 with regard to the first event processing request. In some instances, the second event processing request may be a request to process a different quantity of resources/funds than the first event processing request (e.g., a price of the item may have fluctuated up or down since the first buyer purchased the item).

At step 218, the distributed ledger host platform 102 may receive the second event processing request. For example, the distributed ledger host platform 102 may receive the second event processing request while the second wireless data connection is established. In some instances, actions performed at step 218 may be similar to those described above at step 206 with regard to the first event processing request.

At step 219, the distributed ledger host platform 102 may process the second event (e.g., cause a transfer of funds from the second buyer to the seller). For example, actions performed at step 219 may be similar to those described above at step 207 with regard to the first event.

At step 220, the distributed ledger host platform 102 may record second event processing information, indicating that the second event was successfully processed (e.g., that funds were successfully transferred). In some instances, the distributed ledger host platform 102 may compute a hash of the first block, and, using the hash of the first block, may generate a second block in the distributed ledger. After generating this second block, the distributed ledger host platform 102 may record the second event processing information in the second block. In some instances, the distributed ledger host platform 102 may record information such as time, date, second buyer identity, sale price, seller identity, and/or other information in the second block. In some instances, the first block of the blockchain may be accessible to the seller, the second buyer, and employees of the financial institution, but may otherwise not be accessible by other individuals (the blockchain may be a private blockchain). In some instances, the distributed ledger host platform 102 may configure information stored in the second block of the blockchain to be selectively concealed to certain parties who may otherwise have access to the full second block. For example, the second user computing device 105 may be unable to access a sale price between the first buyer and the seller (e.g., because the first buyer may, in some instances, have paid a lower price than the second buyer for the same item), an identity of the seller, and/or other information. In some instances, rather than sending information to the distributed ledger host platform 102, and having the distributed ledger host platform 102 write the information to the block, the vendor computing system and/or second user computing device 105 may directly write/record the information in the second block. In some instances, actions performed at step 220 may be similar to those performed at step 208 with regard to the first event processing information.

In some instances, in recording the second event processing information, the distributed ledger host platform 102 may generate a smart contract corresponding to the sale of the item, and which may subsequently be used to identify when resources should be transferred from the seller to the first buyer in the event of a return.

In some instances, after receiving the return request from the first buyer and the purchase request from the second buyer, the distributed ledger host platform 102 may embed a return policy into the second block, which may indicate anonymous shipping information for the second buyer (e.g., a QR code, non-identifying shipping label, and/or other information that may be used to ship the item from the first buyer to the second buyer). In some instances, the first buyer may be able to access the return policy in the second block, but might not be able to access other information in the second block, such as an identifier of the second buyer, a purchase price, and/or other information.

At step 221, the vendor computing system 103 may access the distributed ledger (e.g., the second block established at step 220) to confirm that the second event was processed (e.g., that the second buyer successfully paid for the item). If the vendor computing system 103 identifies that the second event was not successfully processed, a notification may be sent to the second user computing device 105, and the second user computing device 105 may return to step 212 to resubmit the second purchase request, or otherwise modify the transaction. If the vendor computing system 103 identifies that the second event was successfully processed, the distributed ledger host platform 102 may proceed to step 222.

Figure 2E:
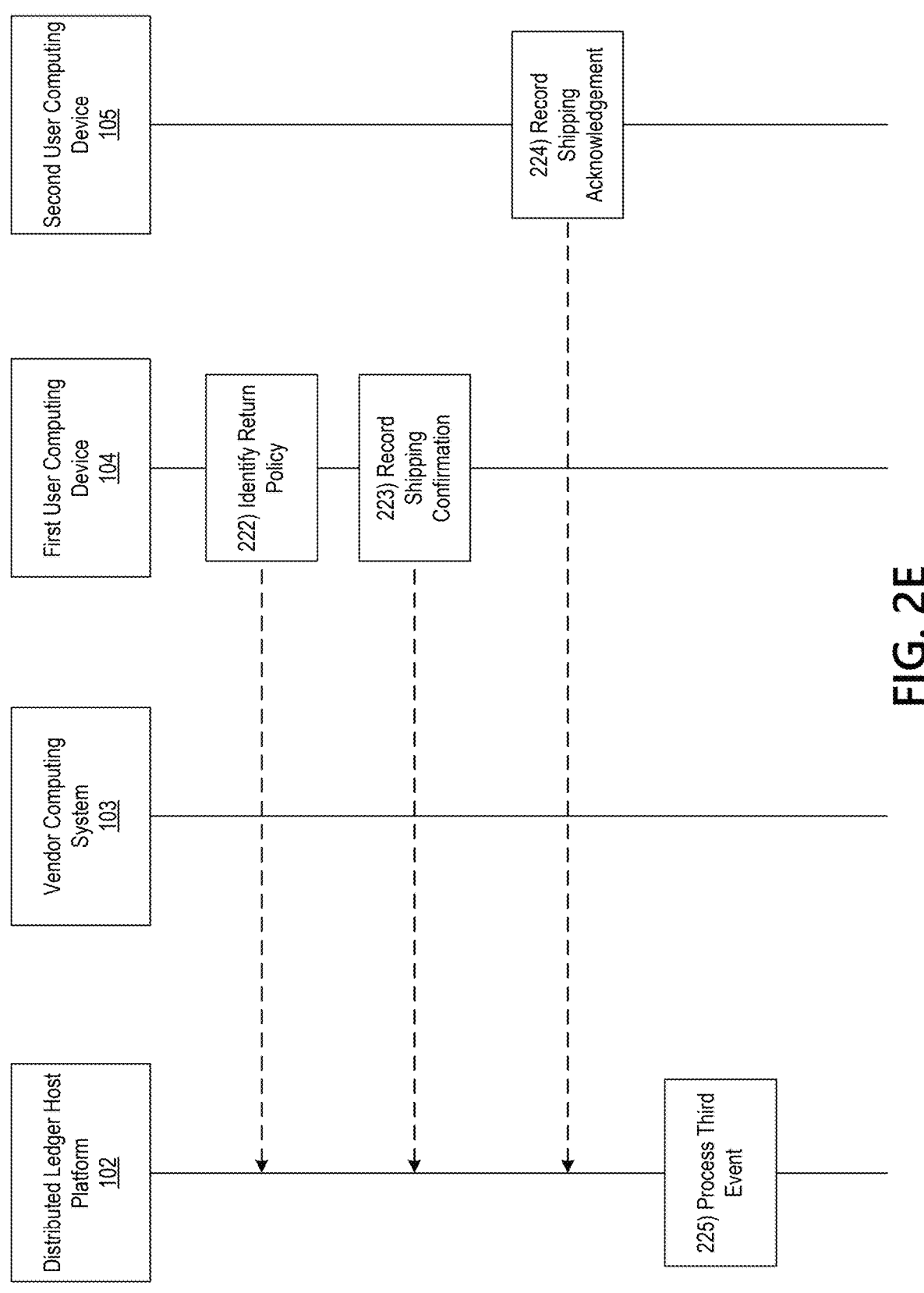

Referring to FIG. 2E, at step 222, the first user computing device 104 may identify a return policy by accessing the distributed ledger. For example, the first user computing device 104 may communicate with the distributed ledger host platform 102 to access the return policy in the second block. In doing so, the first user computing device 104 may access a quick response (QR) code and/or other anonymous shipping information (e.g., a shipping label that may be used by a shipping company to send the item to the second buyer, and that does not expose, to the first buyer, an identity of the second buyer) that may enable the first buyer to ship the item to the second buyer (e.g., without first being returned to the seller) without knowing the identity of the second buyer.

At step 223, the first user computing device 104 may record shipping confirmation information (indicating that the first buyer shipped the item to the second buyer) in the second block of the distributed ledger. For example, the first user computing device 104 may directly access the distributed ledger to record the shipping confirmation information, or may send the shipping confirmation information to the distributed ledger host platform 102, which may cause the distributed ledger host platform 102 to record the shipping confirmation information.

At step 224, the second user computing device 105 may record shipping acknowledgement information (indicating that the second buyer received the item from the first buyer) in the second block of the distributed ledger. For example, the second user computing device 105 may directly access the distributed ledger to record the shipping confirmation information, or may send the shipping acknowledgement information to the distributed ledger host platform 102, which may cause the distributed ledger host platform 102 to record the shipping acknowledgement information.

At step 225, the distributed ledger host platform 102 may identify, by analyzing the distributed ledger, that the second buyer has successfully received the item from the first buyer. Accordingly, the distributed ledger host platform 102 may determine that the first buyer may be refunded, and may process a third event (corresponding to a fund transfer from an account of the seller, to an account of the first buyer). In some instances, the distributed ledger host platform 102 may consult one or more of the generated smart contracts to confirm that resources may be returned to the first buyer from the seller at this time. In some instances, the distributed ledger host platform 102 may record third event processing information (indicating that the third event was successfully processed) in the distributed ledger (e.g., in the second block). In some instances, rather than waiting merely until the second buyer has successfully received the item from the first buyer, the distributed ledger host platform 102 may process the third event in response to identifying that the second buyer has acknowledged receipt of the item. In some instances, this information may be embedded in the return policy.

Figure 2F:
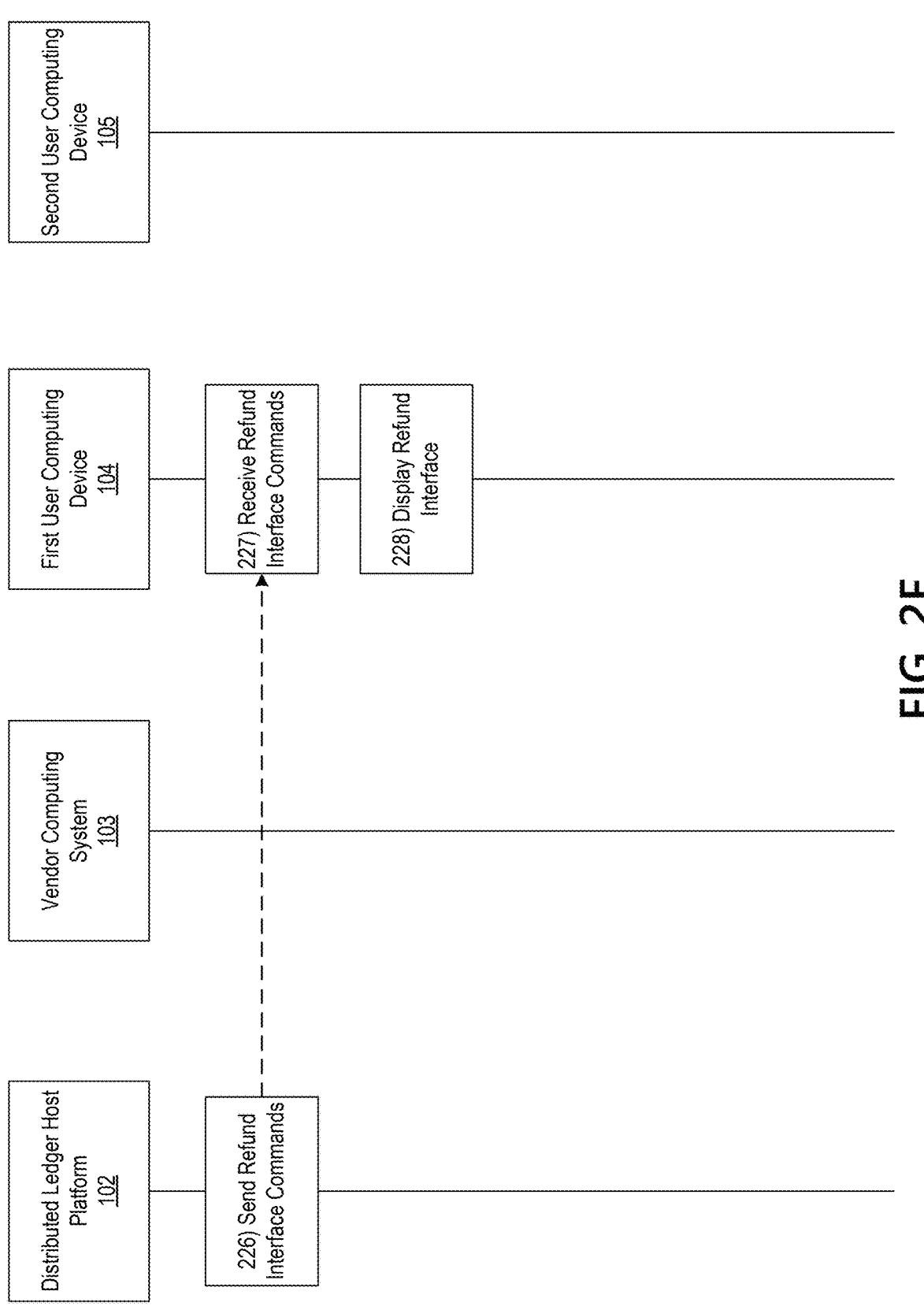

Referring to FIG. 2F, at step 226, the distributed ledger host platform 102 may send one or more commands directing the first user computing device 104 to display a refund interface (e.g., indicating that the purchase of the item by the first buyer was successfully refunded). In some instances, the distributed ledger host platform 102 may send the one or more commands via the communication interface 113 and while a wireless data connection is established with the first user computing device 104 (e.g., a fourth wireless data connection).

At step 227, the first user computing device 104 may receive the one or more commands directing the first user computing device 104 to display the refund interface. For example, the first user computing device 104 may receive the one or more commands while the fourth wireless data connection is established.

At step 228, based on or in response to the one or more commands directing the first user computing device 104 to display the refund interface, the first user computing device 104 may display the refund interface. For example, the first user computing device 104 may display a graphical user interface similar to graphical user interface 405, which is shown in FIG. 4.

In some instances, the above described event sequence may involve the exchange of cryptocurrency, regular currency, or any combination thereof.

Accordingly, by applying the methods described herein, transactions between multiple parties may be efficiently executed/recorded in a verifiable and permanent way (e.g., because data in previous blocks might not be altered retroactively without alteration of all subsequent blocks), and thus transactions may be efficiently processed in circumstances where an initial buyer of an item returns the item by shipping it to a subsequent buyer, rather than returning the item to a merchant. Although a single merchant and two buyers are described herein, any number of merchants/ buyers may be involved without departing from the scope of the disclosure herein.

Figure 3:
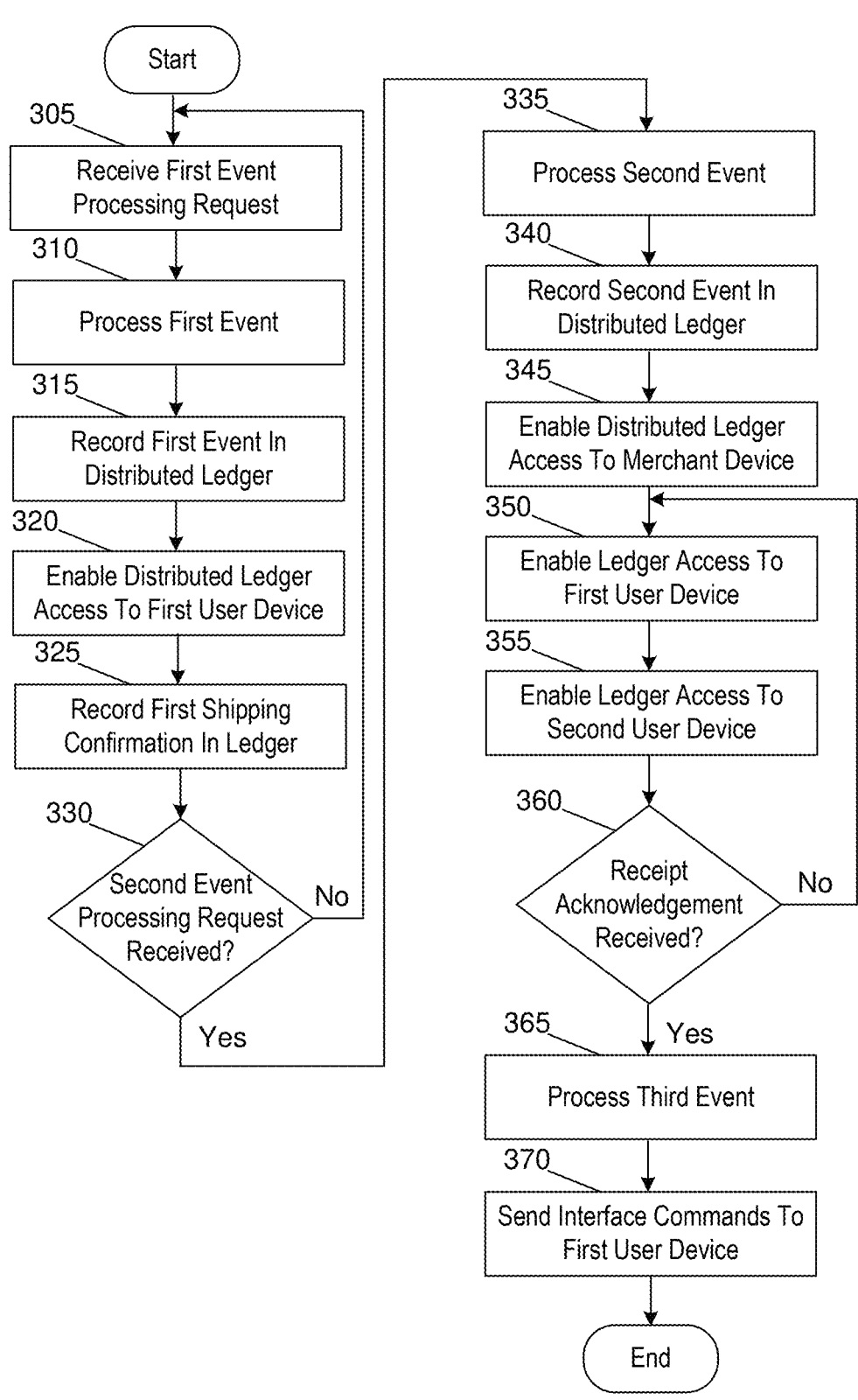
FIG. 3 depicts an illustrative method for improved return logistics using a distributed ledger in accordance with one or more example embodiments.

FIG. 3 depicts an illustrative method for improved return logistics using a distributed ledger in accordance with one or more example embodiments. Referring to FIG. 3, at step 305, a computing platform having at least one processor, a communication interface, and memory may receive a first event processing request. At step 310, the computing platform may process the first event. At step 315, the computing platform may record the first event in a distributed ledger. At step 320, the computing platform may enable a first user device to access the distributed ledger. At step 325, the computing platform may record shipping confirmation information in the distributed ledger. At step 330, the computing platform may identify whether a second event processing request was received. If a second event processing request was not received, the computing platform may return to step 305. If a second event processing request was received, the computing platform may proceed to step 335.

At step 335, the computing platform may process the second event. At step 340, the computing platform may record the second event in the distributed ledger. At step 345, the computing platform may enable distributed ledger access to a merchant computing device. At step 350, the computing platform may further enable the first user computing device to access the distributed ledger. At step 355, the computing platform may enable the second user computing device to access the distributed ledger. At step 360, the computing platform may identify whether or not receipt of a shipped item was received. If not, the computing platform may return to step 350. If so, the computing platform may proceed to step 365.

At step 365, the computing platform may process a third event. At step 370, the computing platform may send one or more commands directing the first user computing device to display a refund interface.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform for performing a blockchain and smart contract based method to reduce delivery time and prevent reverse supply chain logistics for events corresponding to multiple accounts while maintaining party anonymity, the computing platform comprising:
   at least one processor;
   a communication interface communicatively coupled to the at least one processor; and
   memory storing computer-readable instructions that, when executed by the at least one processor, cause the computing platform to:
      process a first event processing request, resulting in first event processing information indicating a first transfer of resources from a first buyer of an item to a seller of the item;
      record, in a first element of a distributed ledger corresponding to the item, the first event processing information, an identity of the first buyer, and an identity of the seller, wherein a first portion of distributed ledger is visible to the first buyer and the seller, and wherein recording the first event processing information further comprises generating a smart contract indicating when resources are to be transferred from the seller to the first buyer in case of a return;
      cause, by communicating with a shipping computing system, the item to be shipped to the first buyer;
      process a second event processing request, resulting in second event processing information indicating a second transfer of resources from a second buyer of the item to the seller, and wherein use of the distributer ledger ensures security of the first event processing request and the second event processing request;
      record, in a second element of the distributed ledger, the second event processing information, an identity of the second buyer, a return policy for the item, and the identity of the seller, wherein a second portion of the distributed ledger is visible to the second buyer and the seller; and
      cause the item to be sent from the first buyer to the second buyer, wherein the first buyer sent a request to return the item, and wherein causing the item to be sent from the first buyer to the second buyer comprises:
         generating, based on the distributed ledger, anonymous shipping information corresponding to the second buyer, wherein the anonymous shipping information is accessible by the first buyer using the distributed ledger, and
         recording shipping confirmation information indicating that the item has been shipped from the first buyer to the second buyer, wherein causing the item to be sent from the first buyer to the second buyer reduces a delivery time associated with shipping the item to the second buyer and prevents the reverse supply chain logistics.

2. The computing platform of claim 1, wherein generating the anonymous shipping information is based on analyzing the return policy.

3. The computing platform of claim 1, wherein the anonymous shipping information further comprises a label that may be used by a shipping company to send the item to the second buyer, and that does not expose, to the first buyer, an identity of the second buyer.

4. The computing platform of claim 1, wherein the distributed ledger comprises a blockchain.

5. The computing platform of claim 1, wherein the first transfer of resources is different than the second transfer of resources.

6. The computing platform of claim 1, wherein the memory stores additional computer-readable instructions that, when executed by the at least one processor, cause the computing platform to:
   generate one or more commands directing a user device of the first buyer to display a graphical user interface indicating that the return has been completed,
   send, to the user device, the one or more commands to display the graphical user interface indicating that the return has been completed, wherein sending the one or more commands to display the graphical user interface indicating that the return has been completed causes the user device to display the graphical user interface indicating that the return has been completed.

7. The computing platform of claim 1, wherein the memory stores additional computer-readable instructions that, when executed by the at least one processor, cause the computing platform to:

identify, using the distributed ledger, that the item has been received by the second buyer; and based on identifying that the item has been received by the second buyer and identifying that conditions of the smart contract have been satisfied, process a third event, wherein processing the third event comprises causes a third transfer of resources, equal to the first transfer of resources, from the seller to the first buyer.

8. The computing platform of claim 7, wherein:

the first transfer of resources comprises a fund transfer from an account of the first buyer to an account of the seller;

the second transfer of resources comprises a fund transfer from an account of the second buyer to the account of the seller; and the third transfer of resources comprises a fund transfer from the account of the seller to the account of the first buyer.

9. The computing platform of claim 1, wherein the first buyer is unable to access:

the identity of the second buyer using the distributed ledger, and an amount paid by the second buyer for the item.

10. The computing platform of claim 1, wherein the memory stores additional computer-readable instructions that, when executed by the at least one processor, cause the computing platform to:

receive the first event processing request corresponding to a first sale of an item.

11. The computing platform of claim 1, wherein the memory stores additional computer-readable instructions that, when executed by the at least one processor, cause the computing platform to:

create the first element of the distributed ledger corresponding to the item.

12. The computing platform of claim 1, wherein the memory stores additional computer-readable instructions that, when executed by the at least one processor, cause the computing platform to:

receive the second event processing request corresponding to a second sale of the item.

13. The computing platform of claim 1, wherein the memory stores additional computer-readable instructions that, when executed by the at least one processor, cause the computing platform to:

create the second element of the distributed ledger corresponding to the item.

14. The computing platform of claim 1, wherein the anonymous shipping information comprises a quick response (QR) code.

15. The computing platform of claim 1, wherein causing the item to be sent from the first buyer to the second buyer further comprises recording receipt confirmation information indicating that the item has been received by the second buyer.

16. A method for performing a blockchain and smart contract based method to reduce delivery time and prevent reverse supply chain logistics for events corresponding to multiple accounts while maintaining party anonymity, the method comprising:

processing a first event processing request, resulting in first event processing information indicating a first transfer of resources from a first buyer of an item to a seller of the item;

recording, in a first element of a distributed ledger corresponding to the item, the first event processing information, an identity of the first buyer, and an identity of the seller, wherein a first portion of distributed ledger is visible to the first buyer and the seller, and wherein recording the first event processing information further comprises generating a smart contract indicating when resources are to be transferred from the seller to the first buyer in case of a return;

causing, by communicating with a shipping computing system, the item to be shipped to the first buyer;

processing a second event processing request, resulting in second event processing information indicating a second transfer of resources from a second buyer of the item to the seller, and wherein use of the distributer ledger ensures security of the first event processing request and the second event processing request;

recording, in a second element of the distributed ledger, the second event processing information, an identity of the second buyer, a return policy for the item, and the identity of the seller, wherein a second portion of the distributed ledger is visible to the second buyer and the seller; and causing the item to be sent from the first buyer to the second buyer, wherein the first buyer sent a request to return the item, and wherein causing the item to be sent from the first buyer to the second buyer comprises:

generating, based on the distributed ledger, anonymous shipping information corresponding to the second buyer, wherein the anonymous shipping information is accessible by the first buyer using the distributed ledger, and recording shipping confirmation information indicating that the item has been shipped from the first buyer to the second buyer, wherein causing the item to be sent from the first buyer to the second buyer reduces a delivery time associated with shipping the item to the second buyer and prevents the reverse supply chain logistics.

17. The method of claim 16, wherein generating the anonymous shipping information is based on analyzing the return policy.

18. The method of claim 16, wherein the anonymous shipping information further comprises a label that may be used by a shipping company to send the item to the second buyer, and that does not expose, to the first buyer, an identity of the second buyer.

19. The method of claim 16, wherein the distributed ledger comprises a blockchain.

20. One or more non-transitory computer-readable media storing instructions that, when executed by a computing platform for performing a blockchain and smart contract based method to reduce delivery time and prevent reverse supply chain logistics for events corresponding to multiple accounts while maintaining party anonymity, the computing platform comprising at least one processor, a communication interface, and memory, cause the computing platform to:

process a first event processing request, resulting in first event processing information indicating a first transfer of resources from a first buyer of an item to a seller of the item;

record, in a first element of a distributed ledger corresponding to the item, the first event processing information, an identity of the first buyer, and an identity of the seller, wherein a first portion of distributed ledger is visible to the first buyer and the seller, and wherein recording the first event processing information further comprises generating a smart contract indicating when resources are to be transferred from the seller to the first buyer in case of a return;

cause, by communicating with a shipping computing system, the item to be shipped to the first buyer;

process a second event processing request, resulting in second event processing information indicating a second transfer of resources from a second buyer of the item to the seller, and wherein use of the distributer ledger ensures security of the first event processing request and the second event processing request;

record, in a second element of the distributed ledger, the second event processing information, an identity of the second buyer, a return policy for the item, and the identity of the seller, wherein a second portion of the distributed ledger is visible to the second buyer and the seller; and cause the item to be sent from the first buyer to the second buyer, wherein the first buyer sent a request to return the item, and wherein causing the item to be sent from the first buyer to the second buyer comprises:

generating, based on the distributed ledger, anonymous shipping information corresponding to the second buyer, wherein the anonymous shipping information is accessible by the first buyer using the distributed ledger, and recording shipping confirmation information indicating that the item has been shipped from the first buyer to the second buyer, wherein causing the item to be sent from the first buyer to the second buyer reduces a delivery time associated with shipping the item to the second buyer and prevents the reverse supply chain logistics.

\* \* \* \* \*